(12) United States Patent
Chiang

(10) Patent No.: US 8,279,347 B2
(45) Date of Patent: Oct. 2, 2012

(54) SYSTEM OF EDGE DIRECTION DETECTION FOR COMB FILTER

(75) Inventor: Tsung Han Chiang, Kaohsiung (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 813 days.

(21) Appl. No.: 12/453,463

(22) Filed: May 12, 2009

(65) Prior Publication Data

US 2009/0295999 A1    Dec. 3, 2009

(30) Foreign Application Priority Data

Jun. 3, 2008   (TW) ............................... 97120587 A

(51) Int. Cl.
*H04N 9/78* (2006.01)

(52) U.S. Cl. ........ 348/630; 348/625; 348/665; 348/663; 382/199; 382/263; 382/266; 382/269

(58) Field of Classification Search .......... 348/663–670, 348/625–631; 382/199, 263, 266–269
See application file for complete search history.

(56) References Cited

U.S. PATENT DOCUMENTS

2006/0268177 A1   11/2006   Chang
2009/0091659 A1*   4/2009   Tanigawa ...................... 348/624

* cited by examiner

*Primary Examiner* — Vivek Srivastava
*Assistant Examiner* — Rong Le
(74) *Attorney, Agent, or Firm* — Bacon & Thomas, PLLC

(57) ABSTRACT

A system of edge direction detection for comb filter includes a buffer, first and second filters, first and second oblique detectors, and a comparator. The buffer receives and stores a composite signal. The first filter performs filtering operation on the composite signal to produce a first filter signal. The second filter performs filtering operation on the composite signal to produce a second filter signal. The first oblique detector detects an oblique in the first filter signal to produce a first oblique indication signal and a first oblique direction signal and output a first minimum oblique difference. The second oblique detector detects an oblique in the second filter signal to produce a second oblique indication signal and a second oblique direction signal and output a second minimum oblique difference. The comparator compares the first and second oblique indication signals and the first and second oblique direction signals to produce edge information.

18 Claims, 7 Drawing Sheets

SYSTEM OF EDGE DIRECTION DETECTION FOR COMB FILTER

BACKGROUND OF THE INVENTION

1. Field of the Invention

The present invention relates to the technical field of image processors and, more particularly, to a system of edge direction detection for comb filter.

2. Description of Related Art

In image processing, the amplitude change or discontinuousness of an image typically indicates that an edge direction detection or an edge enhancement or edge sharping operation is performed on the image for extracting a substantial object from the image.

An edge direction detection algorithm typically uses multiple filters to separate the corresponding frequency bands. However, such a way cannot obtain the desired instinctive output signal, so that using a couple of decisions and setting the weights are required for achieving the expected image quality. Thus, such an edge direction detection algorithm can usually detect a vertical or horizontal edge rather than an oblique edge of a composite signal.

In the US pre-grant publication 2006/0268177, a 2D YC separation device and YC separation system has disclosed, which uses an oblique similarity detector and an oblique comb filter to perform an oblique edge detection on the luma of composite signal, thereby obtaining a composite signal with stronger luma and weaker chroma. However, such a technique is suitable for a monochrome image rather than a color image in which the heavier chroma change can cause a decision mistake.

Therefore, it is desirable to provide a system of edge direction detection for comb filter to mitigate and/or obviate the aforementioned problems.

SUMMARY OF THE INVENTION

The object of the present invention is to provide a system of edge direction detection for comb filter, which can effectively detect an oblique in a color composite signal.

According to a feature of the invention, a system of edge direction detection for comb filter is provided. The system includes a buffer, a first filter, a second filter, a first oblique detector, a second oblique detector and a comparator. The buffer receives and stores a composite signal. The first filter is connected to the buffer in order to perform a filtering operation on the composite signal to thereby produce a first filter signal. The second filter is connected to the buffer in order to perform a filtering operation on the composite signal to thereby produce a second filter signal. The first oblique detector is connected to the first filter in order to detect an oblique in the first filter signal to accordingly produce a first oblique indication signal and a first oblique direction signal and output a first minimum oblique difference. The second oblique detector is connected to the second filter in order to detect an oblique in the second filter signal to accordingly produce a second oblique indication signal and a second oblique direction signal and output a second minimum oblique difference. The comparator is connected to the first oblique detector and the second oblique detector in order to compare the first oblique indication signal, the second oblique indication signal, the first oblique direction signal and the second oblique direction signal to thereby produce an edge information.

According to another feature of the invention, a system of edge direction detection for comb filter is provided. The system includes a buffer, N filters, N oblique detectors and a comparator. The buffer receives and stores a composite signal. The N filters are connected to the buffer in order to perform a filtering operation on the composite signal to thereby produce first to N-th filter signals respectively. The N oblique detectors are connected to the N filters in one to one manner in order to detect obliques in the first to N-th filter signals to accordingly produce first to N-th oblique indication signals and first to N-th oblique direction signals and output first to N-th minimum oblique differences. The comparator is connected to the N oblique detectors in order to compare the first to N-th oblique indication signals and the first to N-th minimum oblique differences to thereby produce an edge information, wherein the N filters are operated in spectra that are exclusive and cover a spectrum of the composite signal.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
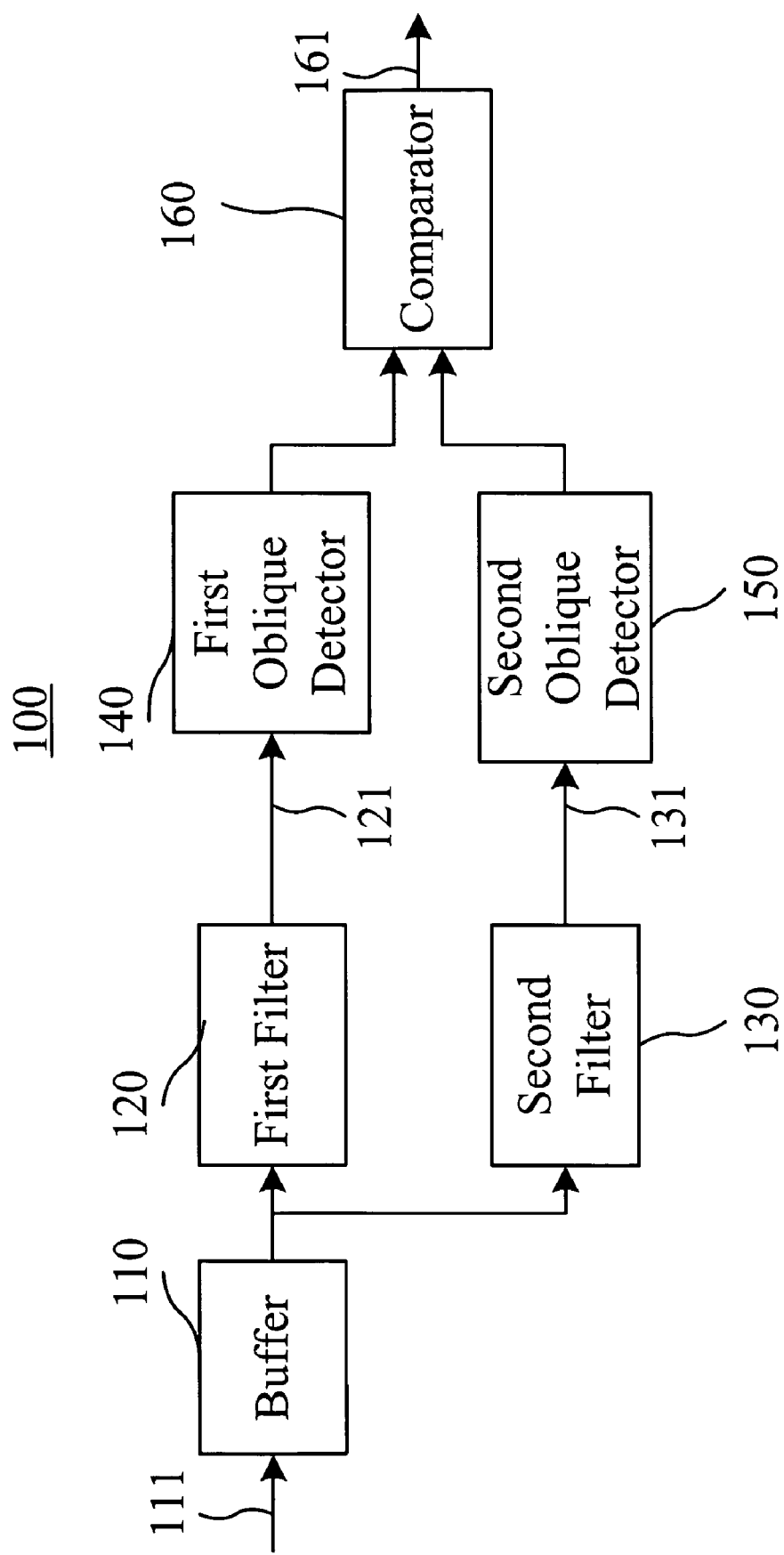
FIG. 1 is a block diagram of a system of edge direction detection for comb filter according to the invention.

FIG. 1 is a block diagram of a system of edge direction detection for comb filter according to the invention. The system 100 includes a buffer 110, a first filter 120, a second filter 130, a first oblique detector 140, a second oblique detector 150 and a comparator 160.

The buffer 110 receives and stores a composite signal 111. The first filter 120 is connected to the buffer 110 in order to perform a filtering on the composite signal 111 to thereby produce a first filter signal 121. The second filter 130 is connected to the buffer 110 in order to perform a filtering on the composite signal 111 to thereby produce a second filter signal 131.

The first oblique detector 140 is connected to the first filter 120 in order to detect the obliques of the first filter signal 121 to accordingly produce a first oblique indication signal and a first oblique direction signal. Further, the first oblique detector 140 outputs a first minimum oblique difference.

The second oblique detector 150 is connected to the second filter 130 in order to detect the obliques of the second filter signal 131 to accordingly produce a second oblique indication signal and a second oblique direction signal. Further, the second oblique detector 150 outputs a second minimum oblique difference.

The comparator 160 is connected to the first oblique detector 140 and the second oblique detector 150 in order to compare the first oblique indication signal, the first oblique direction signal, the second oblique indication signal and the second oblique direction signal to thereby produce an edge information.

The buffer 110 preferably is a line or frame buffer, wherein the line buffer preferably is a five-line buffer.

Figure 2:
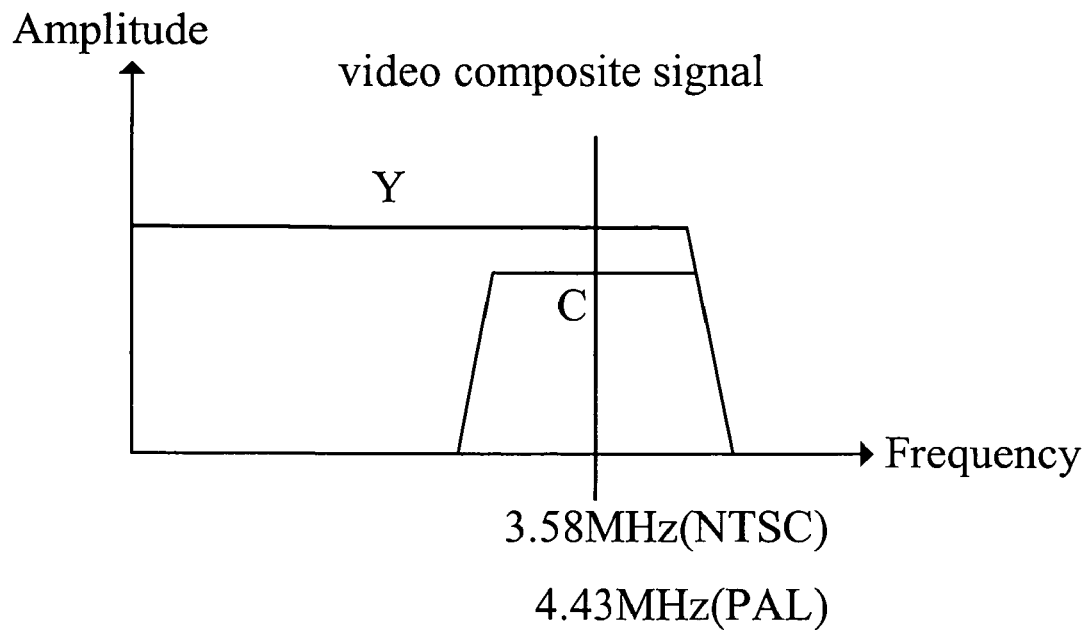
FIG. 2 is a schematic graph of a frequency distribution of a composite signal according to the invention.

FIG. 2 is a schematic graph relating to frequency distribution of the composite signal according to the invention. As shown in FIG. 2, since the luma and chroma signals of the composite signal 111 have the same spectrum, the first filter 120 preferably is a bandpass filter to filter the composite signal 111 to thereby produce the first filter signal 121 in which a luma signal and a chroma signal are included.

The bandpass filter has a parameter of [−1, 0, 2, 0, −1]/4 as the composite signal is an NTSC signal and sampled at a quadri-subcarrier frequency. Alternately, the bandpass filter has a parameter of [−1, 0, 2, 0, −1]/4 as the composite signal is a PAL signal.

The second filter 130 preferably is a notch filter to filter the composite signal 111 to thereby produce the second filter signal 131 in which the luma signal is included. The notch filter has a parameter of [1, 0, 2, 0, 1]/4 as the composite signal is an NTSC signal. Alternatively, the notch filter has a parameter of [1, 0, 2, 0, 1]/4 as the composite signal is a PAL signal.

Figure 3:
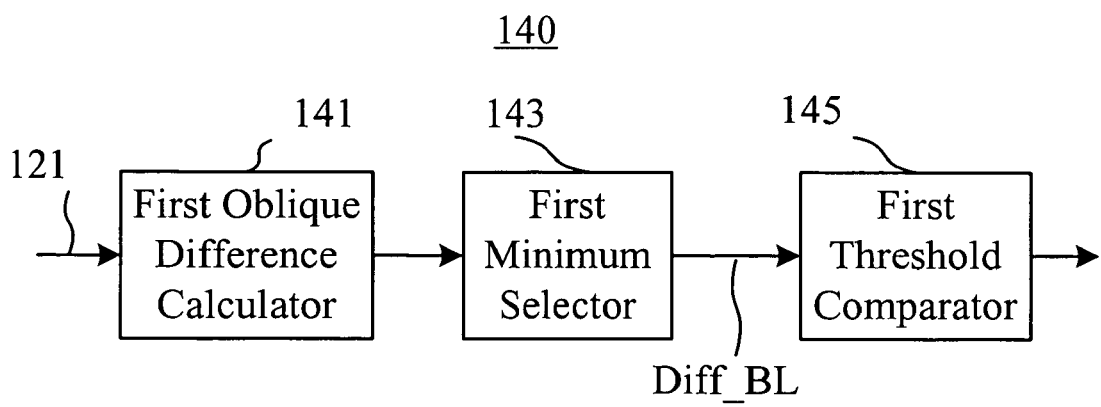
FIG. 3 is a block diagram of a first oblique detector according to the invention.

FIG. 3 is a block diagram of the first oblique detector 140 according to the invention. In FIG. 3, the first oblique detector 140 includes a first oblique difference calculator 141, a first minimum selector 143 and a first threshold comparator 145.

Figure 4:
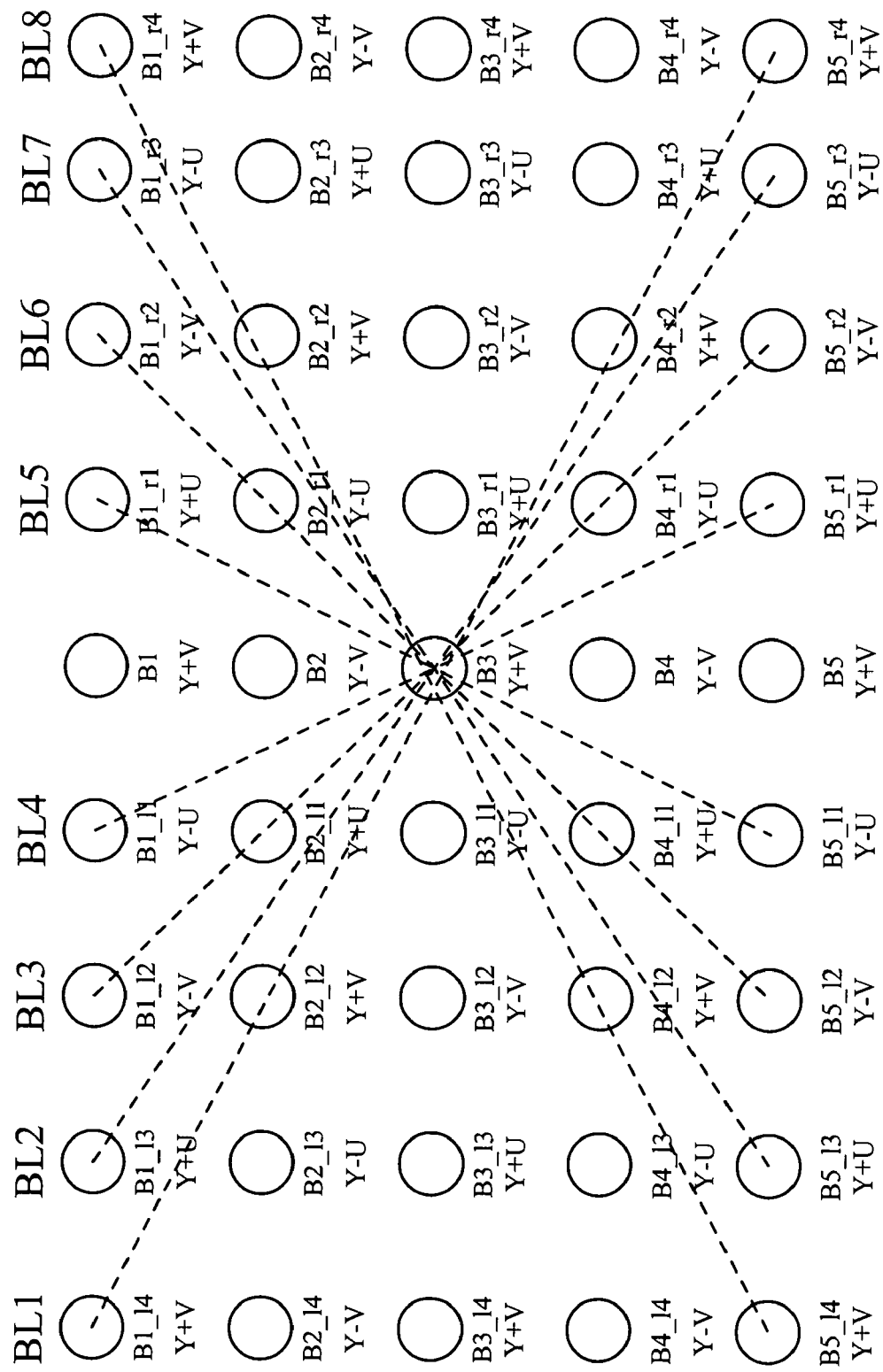
FIG. 4 is a schematic diagram of a first filter signal according to the invention.

The first oblique difference calculator 141 is connected to the first filter 120 in order to compute multiple oblique differences of the first filter signal 121. FIG. 4 is a schematic diagram of the first filter signal 121 according to the invention. As shown in FIG. 4, the first oblique difference calculator 141 computes the differences Diff_BL1 to Diff_BL8 of line sections BL1 to BL8 respectively. For example, the difference Diff_BL1 of the line section BL1 computed by the first oblique difference calculator 141 can be represented as:

$$\text{Diff\_BL1} = \{|B1\_14 - B3| + |B2\_12 - B4\_r2| + |B3 - B5\_r4|\}/3,$$

the difference Diff_BL6 of the line section BL6 can be represented as:

$$\text{Diff\_BL6} = \{|B1\_r2 - B3| + |B2\_r1 - B4\_11| + |B3 - B5\_12|\}/3,$$

and so on.

The first minimum selector 143 is connected to the first oblique difference calculator 141 in order to select a minimum one from the differences Diff_BL1 to Diff_BL8 as the first minimum oblique difference Diff_BL.

The first threshold comparator 145 is connected to the first minimum selector 143 in order to compare the first minimum oblique difference Diff_BL and a first threshold Th1 to accordingly produce the first oblique indication signal and the first oblique direction signal and then output the first minimum oblique difference Diff_BL. When the first minimum oblique difference Diff_BL is smaller than the first threshold Th1, the first oblique indication signal and the first oblique direction signal are produced. For example, if Diff_BL 5 among Diff_BL1 to Diff_BL8 is the minimum, the first minimum selector 143 selects Diff_BL5 as the first minimum oblique difference Diff_BL. When the first minimum oblique difference Diff_BL is smaller than the first threshold Th1, the first threshold comparator 145 produces the first oblique indication signal and the first oblique direction signal. In this case, the first oblique indication signal is one to thereby indicate that the first minimum oblique difference Diff_BL is produced, and the first oblique direction signal is five to thereby indicate the oblique direction corresponding to the first minimum oblique difference Diff_BL.

Figure 5:
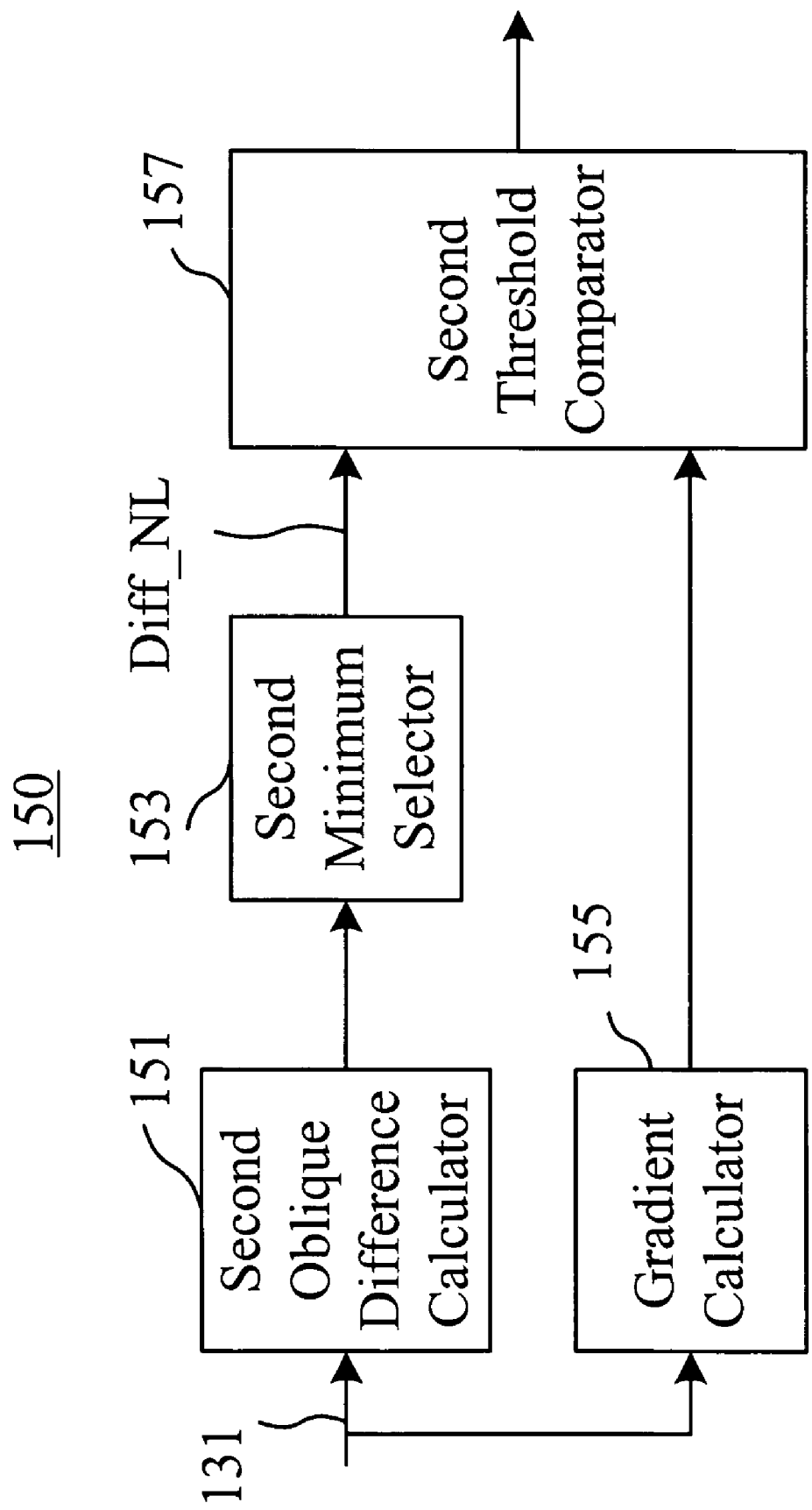
FIG. 5 is a block diagram of a second oblique detector according to the invention.

FIG. 5 is a block diagram of the second oblique detector 150 according to the invention. In FIG. 5, the second oblique detector 150 includes a second oblique difference calculator 151, a second minimum selector 153, a gradient calculator 155 and a second threshold comparator 157.

Figure 6:
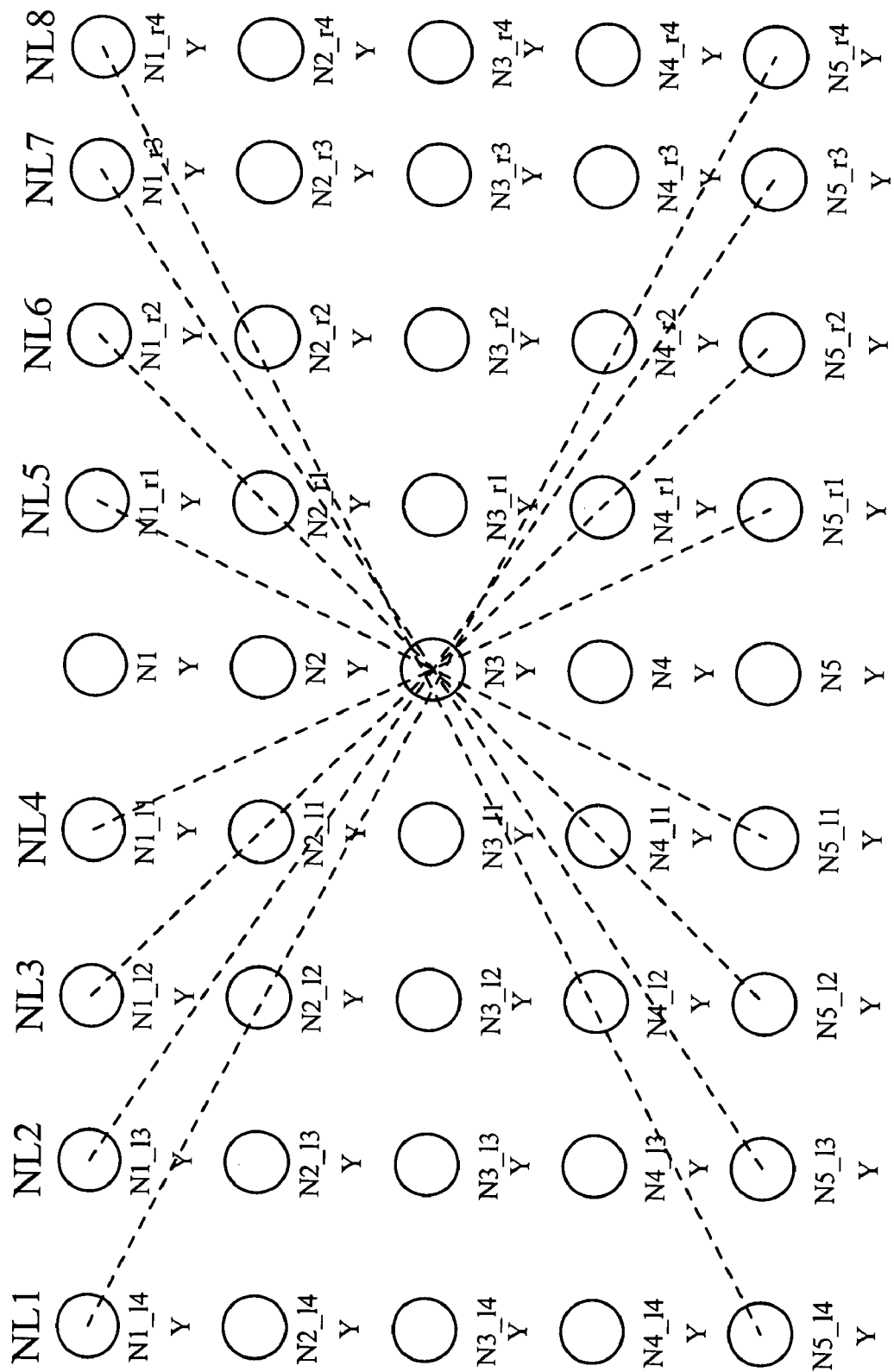
FIG. 6 is a schematic diagram of a second filter signal according to the invention.

The second oblique difference calculator 151 is connected to the second filter 130 in order to compute multiple oblique differences of the second filter signal 131. FIG. 6 is a schematic diagram of the second filter signal 131 according to the invention. As shown in FIG. 6, the second oblique difference calculator 151 computes the differences Diff_NL1 to Diff_NL8 of line sections NL1 to NL8 respectively. For example, the difference Diff_NL6 of the line section NL6 computed by the second oblique difference calculator 151 can be represented as:

$$\text{Diff\_NL6} = \{|N1\_r2 - N2\_r1| + |N2\_r1 - N3| + |N3 - N4\_11| + |N4\_11 - N5\_12|\}/4.$$

The other differences can be determined in the same way and thus a detailed description is deemed unnecessary.

The second minimum selector 153 is connected to the second oblique difference calculator 151 in order to select a minimum one among the differences Diff_NL1 to Diff_NL8 as the second minimum oblique difference Diff_NL.

The gradient calculator 155 is connected to the second filter 130 in order to compute a gradient of the second filter signal 131. The gradient can be represented as:

$$\text{gradient} = \max(|N3\_r1 - N3\_11|, |N3 - N3\_r2|, |N3 - N3\_12|).$$

The second threshold comparator 157 is connected to the second minimum selector 153 and the gradient calculator 155 in order to compare the second minimum oblique difference Diff_BL with a second threshold Th2 and the gradient with a predetermined gradient Th3 to accordingly produce the second oblique indication signal and the second oblique direction signal and output the second minimum oblique difference Diff_NL.

When the second minimum oblique difference Diff_NL is smaller than the second threshold Th2 and the gradient is greater than the predetermined gradient Th3, the second oblique indication signal and the second oblique direction signal are produced.

For example, when Diff_NL7 among Diff_NL1 to Diff_NL8 is the minimum, the second minimum selector 153 selects Diff_BL7 as the second minimum oblique difference Diff_NL. When the second minimum oblique difference Diff_NL is smaller than the second threshold Th2 and the gradient is greater than the predetermined gradient Th3, the second threshold comparator 157 produces the second oblique indication signal and the second oblique direction signal. In this case, the second oblique indication signal is one to thereby indicate that the second minimum oblique difference Diff_NL is produced, and the second oblique direction signal is seven to thereby indicate the oblique direction corresponding to the second minimum oblique difference Diff_NL.

The comparator 160 compares the first oblique indication signal, the first oblique direction signal, the second oblique indication signal and the second oblique direction signal to accordingly produce an edge information 161. When both the first and the second oblique indication signals indicate an edge existence, the comparator 160 selects the smaller one between the differences Diff_BL and Diff_NL and the corresponding oblique direction signal as the edge information. Namely, when both the first and the second oblique indication signals are one, the comparator 160 compares the first minimum oblique difference Diff_BL and the second minimum oblique difference Diff_NL to thereby find the smaller one and its corresponding oblique direction signal as the edge information.

When only the first oblique indication signal is one, the comparator 160 selects the first minimum oblique difference Diff_BL and the first oblique direction signal as the edge information.

When only the second oblique indication signal is one, the comparator 160 selects the second minimum oblique difference Diff_NL and the second oblique direction signal as the edge information.

Figure 7:
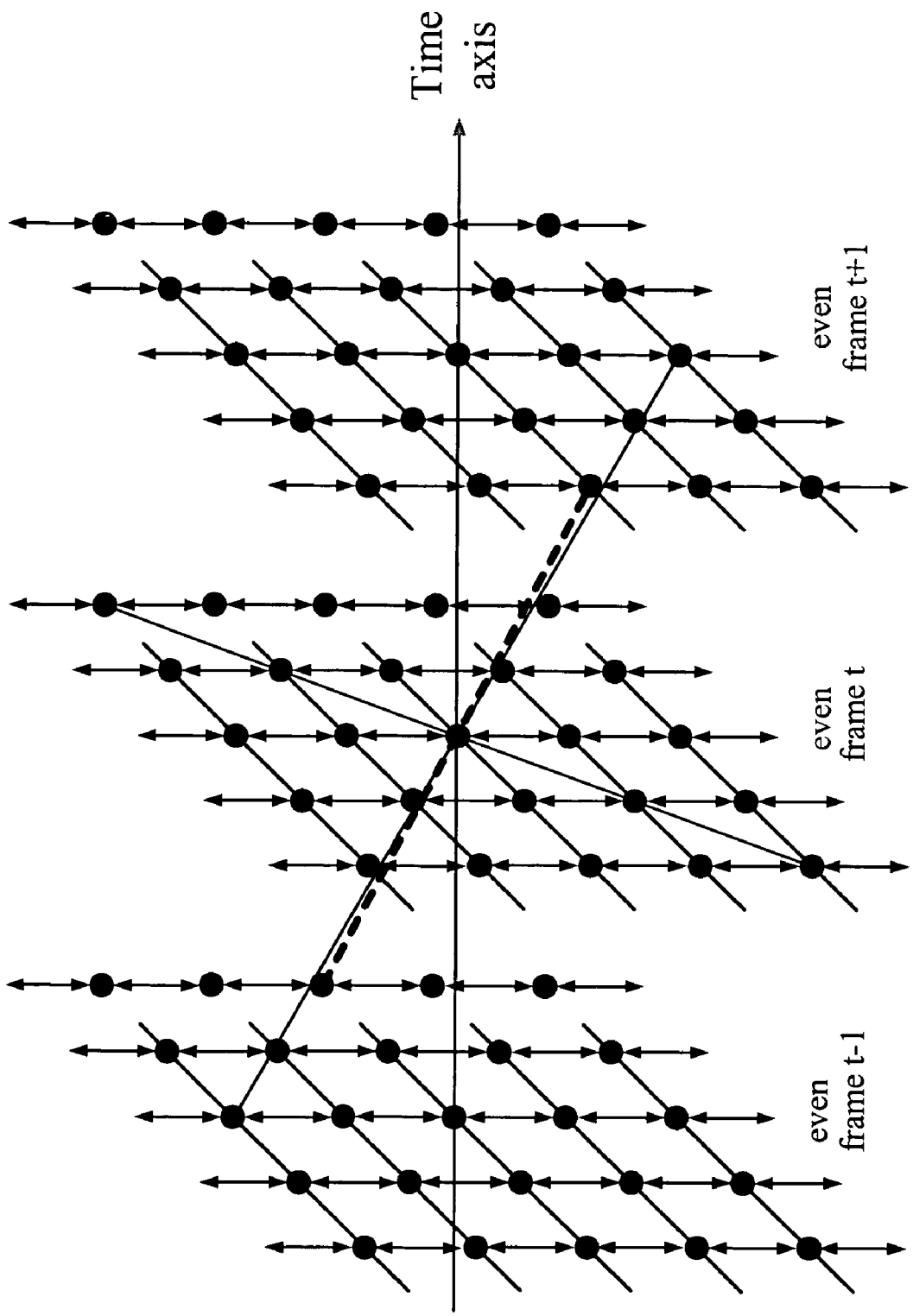
FIG. 7 is a schematic diagram of a buffer storing a composite signal according to the invention.

FIG. 7 is a schematic diagram of the buffer 110 storing a composite signal 111 according to the invention. The buffer 110 is a frame buffer with three frames, which allows the first filter 120, the second filter 130, the first oblique detector 140, the second oblique detector 150 and the comparator 160 to perform a 3D edge direction detection.

Figure 8:
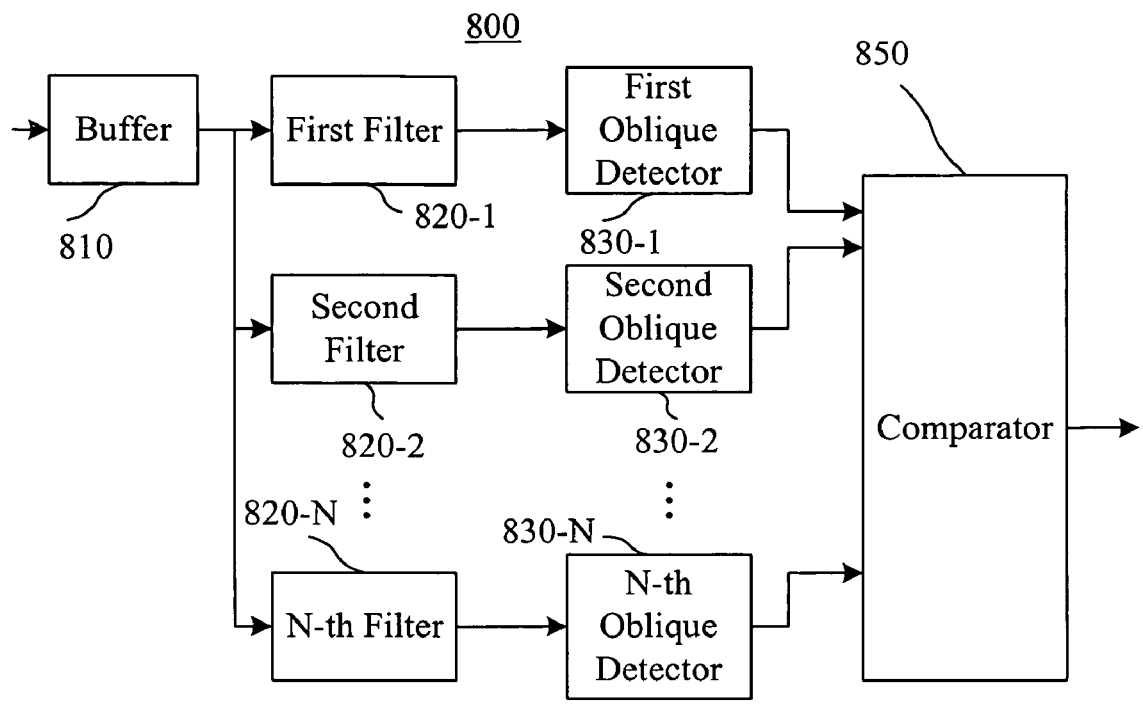
FIG. 8 is a block diagram of another embodiment of a system of edge direction detection for comb filter according to the invention.
Figure 9:
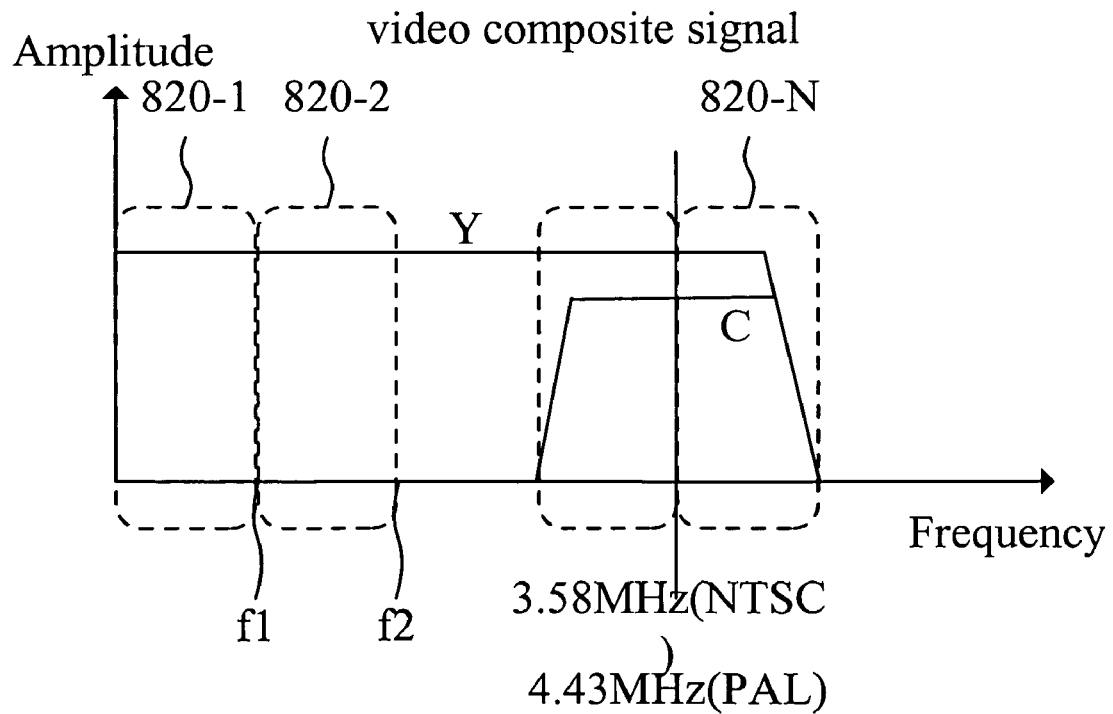
FIG. 9 is a graph of operating spectra of N filters according to the invention.

FIG. 8 is a block diagram of another embodiment of edge direction detection for comb filter according to the invention. In FIG. 8, the system 800 includes a buffer 810, N filters 820-1 to 820-N, N oblique detectors 830-1 to 830-N and a comparator 850. The buffer 810, the N oblique detectors 830-1 to 830-N and the comparator 850 are identical to those of FIG. 1. The operating spectra of the N filters 820-1 to 820-N are exclusive and cover the spectrum of the composite signal. FIG. 9 is a graph of the operating spectra of the N filters 820-1 to 820-N according to the invention. As shown in FIG. 9, the operating spectrum ranges 0~f1 for the filter 820-1, f1~f2 for the filter 820-2, and the like.

As cited, the prior art only uses an oblique similarity detector and an oblique comb filter to perform an oblique edge detection on a composite signal, which essentially performs the oblique edge detection on luma signals to thereby find the composite signals with stronger luma and weaker chroma signals for determining the oblique edge. However, for determining the oblique edge, the invention uses the first and the second oblique detectors 140 and 150 to thereby add several decision conditions and overcome the limit that the prior art can be used only in a monochrome image. When the first oblique detector 140 in the invention detects the oblique in the first filter signal 121, the phases Y+U, Y−U, Y+V, Y−V of composite signal are considered, and in this case the edge component of an image corresponding to the composite signal can be determined more accurate than the prior art. Thus, the decision mistake caused by the heavier chroma change of a color image in the prior art is thus overcome.

Although the present invention has been explained in relation to its preferred embodiment, it is to be understood that many other possible modifications and variations can be made without departing from the spirit and scope of the invention as hereinafter claimed.

What is claimed is:
1. A system of edge direction detection for comb filter, comprising:
 a buffer, for receiving and storing a composite signal; a first filter, connected to the buffer, for filtering the composite signal to produce a first filter signal; a second filter, connected to the buffer, for filtering the composite signal to produce a second filter signal;
 a first oblique detector, connected to the first filter, for detecting an oblique of the first filter signal to produce a first oblique indication signal and a first oblique direction signal and output a first minimum oblique difference;
 a second oblique detector, connected to the second filter, for detecting an oblique of the second filter signal to produce a second oblique indication signal and a second oblique direction signal and output a second minimum oblique difference; and
 a comparator, connected to the first oblique detector and the second oblique detector, for comparing the first oblique indication signal, the second oblique indication signal, the first oblique direction signal and the second oblique direction signal to thereby produce an edge information;
 wherein the first filter signal comprises a luma signal and a chroma signal, and the second filter signal comprises a luma signal.

2. The system as claimed in claim 1, wherein the buffer is a line buffer or a frame buffer.

3. The system as claimed in claim 2, wherein the line buffer is a five-line buffer.

4. The system as claimed in claim 1, wherein the first filter is a bandpass filter.

5. The system as claimed in claim 4, wherein the bandpass filter has a parameter of $[-1, 0, 2, 0, -1]/4$ when the composite signal is an NTSC signal.

6. The system as claimed in claim 4, wherein the bandpass filter has a parameter of $[-1, 0, 2, 0, -1]/4$ when the composite signal is a PAL signal.

7. The system as claimed in claim 1, wherein the second filter is a notch filter.

8. The system as claimed in claim 7, wherein the notch filter has a parameter of $[1, 0, 2, 0, 1]/4$ when the composite signal is an NTSC signal.

9. The system as claimed in claim 7, wherein the notch filter has a parameter of $[1, 0, 2, 0, 1]/4$ when the composite signal is a PAL signal.

10. The system as claimed in claim 1, wherein the first oblique detector comprises: a first oblique difference, calculator connected to the first filter, for computing oblique differences from the first filter signal; a first minimum selector, connected to the first oblique difference calculator, for selecting a minimum one among the oblique differences as the first minimum oblique difference; and a first threshold comparator, connected to the first minimum selector, for comparing the first minimum oblique difference and a first threshold to produce the first oblique indication signal and the first oblique direction signal and output the first minimum oblique difference.

11. The system as claimed in claim 10, wherein the first oblique indication signal and the first oblique direction signal are produced when the first minimum oblique difference is smaller than the first threshold.

12. The system as claimed in claim 11, wherein the second oblique detector comprises: a second oblique difference calculator, connected to the second filter, for computing oblique differences from the second filter signal; a second minimum selector, connected to the second oblique difference calculator, for selecting a minimum one among the oblique differences as the second minimum oblique difference; a gradient calculator, for computing a gradient of the second filter signal; and a second threshold comparator, connected to the second minimum selector and the gradient calculator, for comparing the second minimum oblique difference with a second threshold and the gradient with a predetermined gradient to thereby produce the second oblique indication signal and the second oblique direction signal respectively and output the second minimum oblique difference.

13. The system as claimed in claim 12, wherein the second oblique indication signal and the second oblique direction signal are produced when the second minimum oblique difference is smaller than the second threshold and the gradient is greater than the predetermined gradient.

14. The system as claimed in claim 13, wherein the comparator selects the smaller one between the first minimum oblique difference and the second minimum oblique difference, and the corresponding first or second oblique direction signal as the edge information when both the first oblique indication signal and the second oblique indication signal indicate an edge existence.

15. The system as claimed in claim 13, wherein the comparator selects the first minimum oblique difference and the first oblique direction signal as the edge information when only the first oblique indication signal indicates an edge existence.

16. The system as claimed in claim 13, wherein the comparator selects the second minimum oblique difference and the second oblique direction signal as the edge information when only the second oblique indication signal indicates an edge existence.

17. A system of edge direction detection for comb filter, comprising:
- a buffer, for receiving and storing a composite signal;
- N filters, respectively connected to the buffer, for filtering the composite signal to produce first to N-th filter signals respectively;
- N oblique detectors, respectively connected to the N filters in one to one manner, for detecting obliques in the first to N-th filter signals to produce first to N-th oblique indication signals and first to N-th oblique direction signals and output first to N-th minimum oblique differences; and
- a comparator, connected to the N oblique detectors, for comparing the first to N-th oblique indication signals and the first to N-th minimum oblique differences to thereby produce an edge information; wherein N is a positive integer, and the N filters are operated in spectra that are mutually exclusive and cover a spectrum of the composite signal;

wherein the first to N-th filter signals comprises a luma signal and a chroma signal.

18. The system as claimed in claim 17, further including a K-th oblique detector comprising a K-th oblique difference calculator, connected to the K-th filter for computing oblique differences from the K-th filter signal, wherein K is a positive integer and $1 \leq K \leq N$;
- a K-th minimum selector, connected to the K-th oblique difference calculator, for selecting a minimum one among the oblique differences as a K-th minimum oblique difference; and a first threshold comparator, connected to the K-th minimum selector, for comparing the K-th minimum oblique difference and a K-th threshold to thereby produce the K-th oblique indication signal and the K-th oblique direction signal and output the K-th minimum oblique difference.

* * * * *